Aug. 15, 1944.   C. E. KERR   2,355,735
QUALITY GRADER
Filed Dec. 21, 1942   2 Sheets-Sheet 1
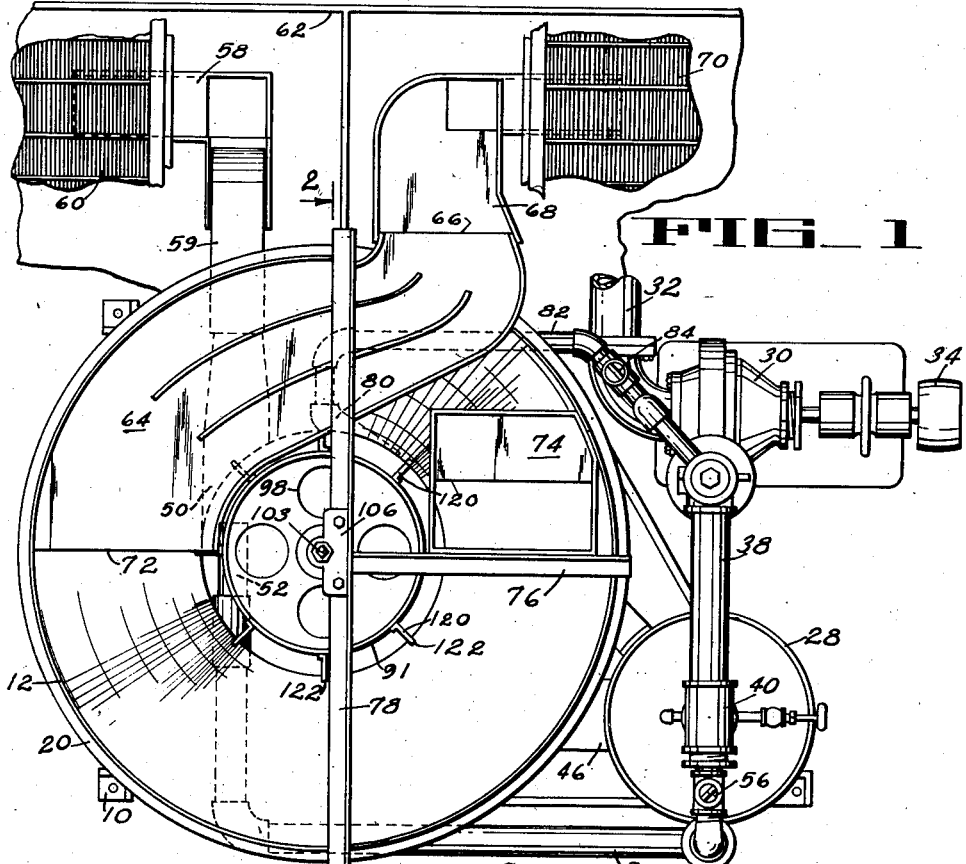
FIG_1
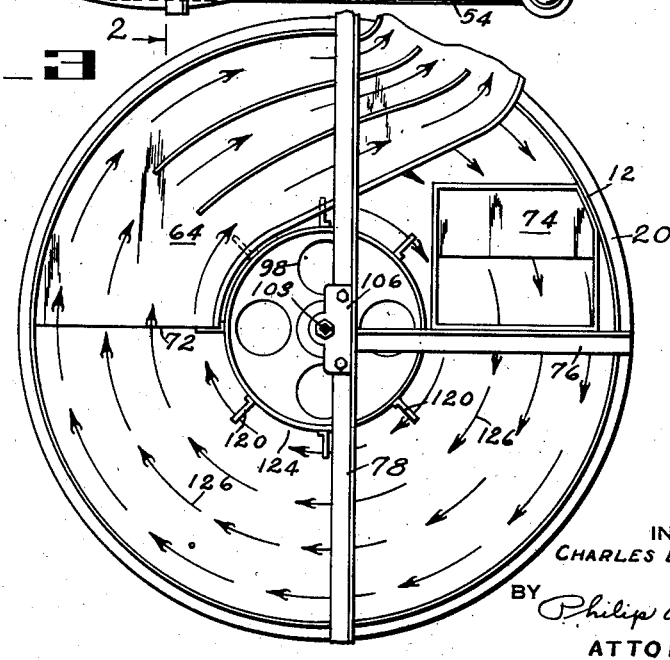
FIG_3
INVENTOR
CHARLES E. KERR
BY Philip A. Minnis
ATTORNEY Aug. 15, 1944.        C. E. KERR        2,355,735
QUALITY GRADER
Filed Dec. 21, 1942        2 Sheets-Sheet 2
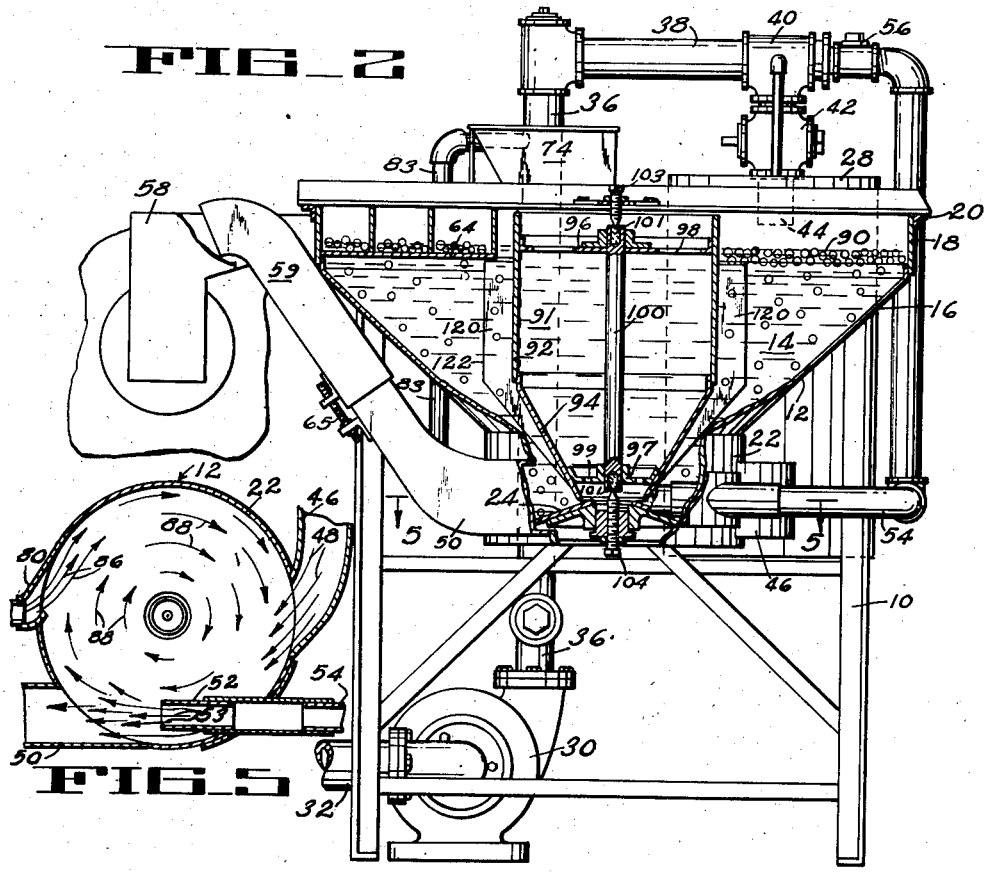
FIG_2
FIG_3
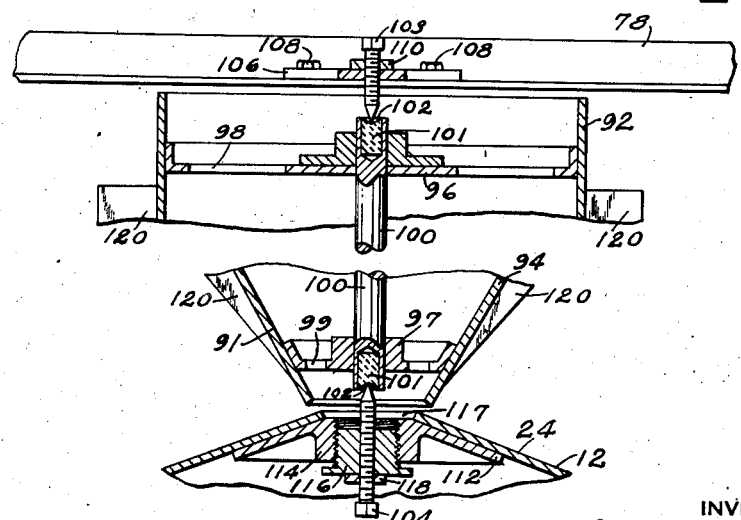
FIG_4
INVENTOR
CHARLES E. KERR
BY
Philip G. Minnis
ATTORNEY Patented Aug. 15, 1944

2,355,735

UNITED STATES PATENT OFFICE 2,355,735

QUALITY GRADER

Charles E. Kerr, Hoopeston, Ill., assignor to Food Machinery Corporation, San Jose, Calif., a corporation of Delaware Application December 21, 1942, Serial No. 469,600

5 Claims. (Cl. 209—173)

This invention relates to apparatus for grading peas and the like in accordance with their quality, for instance in separating tender peas from hard peas in accordance with their differences in specific gravity.

The invention is especially concerned with graders of the general type disclosed in the patent to Lewis, 1,996,022, granted March 26, 1935, wherein a whirling pool of brine solution having a spirally and upwardly flowing current is utilized as the separating medium and the liquid is directed along a circular raceway having stationary concentric walls. In the operation of such apparatus peas which have been previously graded for size and usually blanched are deposited on the surface of the whirling pool of brine solution. The tender peas float on the surface of the brine and are carried thereby to a discharge point where they are skimmed off. The hard peas sink and are drawn off at the bottom of the pool.

I have discovered that in the operation of graders of the foregoing type eddy currents are set up along the inner wall of the raceway, and the eddy currents thus formed have been found to interfere with the grading operation. For one thing, they retard forward movement of the peas adjacent the inner wall of the raceway thus reducing the capacity of the grader. Secondly, many tender peas caught in the eddies are held there until they become saturated with brine and sink or are drawn down along with the sinkers. Thus there also is a loss of the choice product.

I have now discovered that the foregoing difficulties may be minimized or substantially overcome and the rate and effectiveness of separation be increased by imparting rotation to the inner wall of the raceway in the direction of rotation of the liquid, preferably by hydraulic action of the liquid and preferably at the speed of the whirling liquid.

Accordingly, it is the general object of my invention to provide an improved grading apparatus for peas and the like having an increased capacity and wherein the loss of choice products is minimized.

It is also an object to provide a grading apparatus in which agitation in the whirling pool of separating solution is minimized so that the liquid flows in a comparatively true circle substantially free of eddy currents.

Other objects and advantages of my invention will become more apparent from the following description taken in connection with the accompanying drawings wherein:

Fig. 1 is a plan view of the apparatus of my invention, only part of the structure for separating the fluid from the peas being shown;

Fig. 2 is a side elevation of the apparatus, but partly in section as indicated by the arrows 2—2 in Fig. 1.

Fig. 3 is a plan view of the separating tank illustrating schematically the water action;

Fig. 4 is an enlarged sectional view, parts being broken away, of a portion of the structure in Fig. 2; and Fig. 5 is a section taken as indicated by the arrows 5—5 in Fig. 2 illustrating schematically the water action.

It is to be observed that for purposes of clarity and brevity some of the auxiliary apparatus used in the complete grading operations is only partially disclosed in the drawings since it may be of conventional construction and is unnecessary to a full understanding of the present invention. It will be further understood that while my invention is well adapted for use in connection with grading of peas, and hence the illustrative embodiment will be described as thus employed, this is but one of various possible applications, since, as will become self-evident hereinafter, the invention may also be utilized for grading corn, beans and other products and such uses are therefore fully contemplated.

Referring to the drawings, in which similar numerals indicate similar parts throughout the several views, 10 (Fig. 2) is a frame structure supporting a circular separating or settling tank 12, in which is maintained a body of separating solution 14, customarily a brine solution of proper specific gravity for the particular operation. The tank 12 consists of a central inverted frustoconical section 16, to the upper end of which is secured, as by welding, a cylindrical rim portion 18 having a peripheral angle stiffening bar 20. A second cylindrical extension 22 having an inverted dish-shaped bottom 24 is welded to the lower end of the central section.

Adjacent the separating tank 12 and supported by the frame 10 is a cylindrical solution reservoir 28 open at the top and substantially equal in height to the tank 12. The reservoir 28 receives solution from the discharge side of a pump 30 which draws the solution from a source not shown through a pipe 32. The pump may be driven through suitable means, for instance a pulley 34 (Fig. 1), connected to a source of power, for instance an electric motor not shown. The pump discharges the brine into a vertical pipe 36 which in turn is connected to a transversely extending pipe 38 above the reservoir 28. The pipe 38 terminates in a T fitting 40 the vertical branch of which connects with a valve 42 having an outlet 44 in the reservoir tank 28. Brine flows from the bottom of the reservoir 28 through a square inlet conduit 46 into the separating tank 12. The inlet conduit is attached tangentially to the lower cylindrical section 22 of the tank as seen in Fig. 5 so that the brine enters the bottom of the separating tank in a whirling current as indicated by the arrows 48 in this figure.

A square discharge conduit 50 through which some of the whirling brine may discharge is provided for conducting the harder peas or sinkers out of the separating tank. This conduit is also tangentially connected to the section 22 of the tank 12, but at 90° to the conduit 46. In order to assist the discharge of the sinkers through the conduit 50 an additional discharge current is provided. Thus a nozzle 52 projects into the separating tank tangentially to the section 22 and in line with and centrally of the discharge conduit 50, as seen in Figs. 1 and 5 to inject a small body of liquid under pressure in the direction indicated by the arrows 53 in Fig. 5. It has been found that a small body of liquid flushes out the sinkers better than a large body and with less agitation to the grading liquid. The nozzle 52 connects through a pipeline 54 with a horizontal branch of the T fitting 40. A valve 56 is provided for adjusting the rate of flow of liquid from this nozzle. The sinker discharge conduit 50 extends upwardly as shown in Fig. 2 and discharges the sinkers and their conveying brine into a hopper or chute 58 through an adjustable spout 59. The height of the outlet of the spout determines the fluid level in the separating tank 12. The sinkers and brine discharge into a slotted drainage reel 60 (Fig. 1) which permits the brine to drain off into a supply tank 62. The particular construction of this drainage reel forms no part of the present invention and hence further description thereof is deemed unnecessary, but it may be said that the sinkers are directed therefrom to a suitable collection device not shown. From the tank 62 the brine is returned to the pump 30 through the pipeline 32.

In order to remove the tender peas floating on the surface or near the surface of the brine in the separating tank 12 an adjustable skimming plate 64 is provided. In practice the spout 59 of the sinker discharge conduit is adjusted by the screw 65 to a height to obtain the desired fluid level in the separating tank 12 so that there will be an adequate overflow of brine at the point 66 of the skimming plate (see Fig. 1) to carry the tender peas out upon the chute 68 which discharges the brine and peas into a second slotted drainage reel 70 permitting the brine to drain off into the tank 62. The skimming plate may also be adjustable to position the leading edge 72 thereof at the desired depth beneath the surface of the brine. The tender peas are directed from the reel 70 to a suitable collection device not shown.

A hopper 74 for receiving the peas to be graded is disposed above the mouth of the tank 12 at one side thereof and on the opposite side of the tank from the leading edge portion 72 of the skimming plate. The hopper is mounted upon an angle bar support consisting of the horizontal angle rails 76 and 78 set 90° to each other and which intersect at the center of the tank. The outer ends of the rails are secured to the stiffener angle 20 of the separating tank 12.

The brine solution 14 upon being admitted by the conduit 46 into the lower section 22 of the separating tank creates a circular current that flows spirally and upwardly through the conical and upper sections of the separating tank where it overflows at the skimmer discharge point 66. In order to control rotation of the brine and to give it added impetus additional fluid is injected tangentially under pressure into the section 22 of the separating tank from an inlet 80 (see Figs. 1 and 5) of a pipe 82 having a vertical branch 83 connected to the upper end of the pump discharge line 36 as seen in Fig. 2. A valve 84 (Fig. 1) is provided to adjustably control the booster action.

As shown in Fig. 5 the brine is injected from the inlet 80 in the direction of the arrows 86, the established flow of the current therefrom and from the conduit 46 being indicated by the arrows 88. It will be understood that the liquid not only has a circular flow in the separating tank but because of the constant overflow at the discharge point 66 of the skimming plate, the current also flows spirally and upwardly through the conical and upper section of the separating tank 12.

Positioned centrally of the tank 12, and extending downwardly into the brine from above the liquid level 90, is a drum or baffle, generally designated by the numeral 91. The drum 91 isolates the central portion of the liquid from the surrounding body thereof to keep peas out of the center of the whirlpool from which they would be difficult to remove. Moreover, it determines with the wall of the tank 12 what may be called a circular raceway through which the whirling solution may flow. The raceway provides an ample path of movement between the hopper 74 and skimmer 64 for peas deposited in the brine over which proper separation of the peas may take place. Preferably the drum 91 extends the full depth of the tank 12 so as to eliminate the center of the whirlpool for the entire depth of the solution.

An important feature of the invention is to rotate the drum 91 and preferably rotate it at a speed substantially equal to that of the whirling liquid. In this manner I find it possible to minimize the creation of eddy currents adjacent the side of the drum which would result from the whirling current if the drum were stationary. The presence of eddy currents diminishes the effective width of the raceway for proper separation of the peas since the eddies tend to hold the peas along the inner portion of the raceway and retard their forward movement to the skimming plate. Moreover, this retardation sometimes allows tender peas to become brine saturated so that they sink, and the eddies also interfere with the descent of the sinking peas. The rotating drum of the invention, by eliminating the eddies, makes it possible to provide a substantially smooth and true circular flow of the liquid with a minimum of agitation and provides a maximum area adjacent the surface of the liquid for the proper separation of peas.

The body of the drum 91 may be made of sheet metal and its peripheral surface is preferably closed to the passage therethrough of liquid in the tank. As shown in Figs. 2 and 4 it preferably consists of an upper cylindrical tubular section 92 telescoping with a lower conical tubular section 94, which is preferably so shaped as to create a sloping surface to prevent sinkers from rising and returning to the surface to mix with the tender peas. A flanged hub 96 is attached inwardly of the section 92 and a further flanged hub 97 is positioned inwardly of the section 94 to support the drum. Rigidly secured to the hubs centrally thereof is a vertical shaft 100 with which the drum 91 rotates. The hubs 96 and 97 are provided with openings 98 and 99 respectively by means of which liquid in the tank may enter the drum and rise to the liquid level 90.

In the exemplified embodiment of the invention the drum 91 is mounted for rotation by the circulating current of brine itself, that is, by the hydraulic action of the circulating liquid and to best accomplish this the opposite ends of the shaft 100 are provided with substantially frictionless bearings, preferably jewel bearings 101 for instance of the agate cone type which may be cemented in place in suitable bores in the ends of the shaft 100. The bearings have conical recesses 102 for receiving adjustable upper and lower stationary pointed pivot screws 103 and 104 respectively, between which the drum may revolve.

As shown in Figs. 1 and 4, the upper pivot screw 103 is mounted in a threaded bearing plate 106 secured to the tank angle rail 78 by bolts 108. A check nut 110 locks the screw 103 in adjusted position. Secured to the lower face of the bottom 24 of the tank 12 as by welding is a flanged member 112 having a hub portion 114 into which is threadedly secured a bushing 116. The lower pivot screw 104 is threaded into this bushing and projects through an opening 117 of the tank bottom 24 to engage the lower shaft bearing 101. A check nut 118 locks this screw in adjusted position.

As shown in Figs. 1 and 2 the drum 91 is provided with a series of relative narrow circumferentially spaced projections, such as the fins 120, that extend longitudinally of the axis of the drum and project radially of the drum into the brine. The fins preferably extend along the surface of the drums substantially the depth of the brine and each fin has an outer edge 122 extending substantially parallel to the drum section 92, to the lower extremity of such section, from which point it tapers inwardly to the end of the drum section 94. These fins serve a number of purposes. Under the hydraulic action of the brine they tend to drive the drum approximately at the same speed as that of the circulating brine to obtain most effective elimination of eddies. They also enable the drum to automatically synchronize its speed substantially to that of the circulating brine. Moreover, they form pockets 124 (Fig. 3) further aiding in stabilizing any agitation of the current about the center of the tank so that the brine flows in a comparatively true circle. Obviously the fins do not produce a stirring action in the liquid.

It will be understood that while I have shown and prefer that the drum 91 be driven by the circulating brine I may if desired provide suitable means for positively driving this member in the direction of rotation of the brine at a given rate of speed synchronized with that of the circulating brine.

In operation of the machine the peas which are to be graded for quality are introduced into the hopper 74 by any suitable means such as a conveyor not shown. The hopper deposits the peas on the surface of the brine which is flowing clockwise in the tank 12 as indicated by the arrows 126 in Fig. 3. The brine flow is preferably controlled so that it requires from 7 to 12 seconds for tender peas to float from the hopper 74 to the leading edge 72 of the skimming plate 64. During this travel the peas have an opportunity to spread out over the surface of the brine and the hard peas disengage from the mass and sink in the brine. As will be seen there is no opportunity for peas to collect in the central portion of the tank, because they are excluded therefrom by the drum 91 which serves as a baffle and directs the sinking peas to the bottom. Moreover, because the drum 91 rotates with the circulating fluid and eliminates eddy currents adjacent the drum, the fluid rotates in a substantially true circular path so that peas may be properly separated over the entire width of the raceway of the apparatus and in this manner maximum capacity and most effective separation is obtained by the machine. As the hard peas sink in the brine they pass into the cylindrical section 22 of the separating tank 12 and collect adjacent the bottom 24 of the tank from which they are swept by the current indicated by the arrows 88 in Fig. 5 around to the discharge conduit 50 to which they are carried by a portion of the incoming brine from the inlet conduit 46. Moreover, the sinker discharge current 53 from the pipe 52 aids in dispatching the sinkers into the conduit 50. The sinkers and brine carrying them are then carried upwardly through the conduit and are discharged from the nozzle 59 into the hopper 58 and thence into the drainage reel 60 where the sinkers are separated from the liquid for collection. The balance of the surplus brine entering the inlet 46 whirls spirally and upwardly through the tank 12 and is discharged at the top over the outer edge 66 of the skimming plate 64 carrying with it the floating tender peas.

While the particular structure herein described is well adapted for carrying out the objects of the present invention, it will be understood that various modifications, changes and substitutions may be made without departing from the spirit thereof and the present invention is to be construed to include all such modifications, changes and substitutions as may come within the scope of the following claims.

What I claim as new and desire to protect by Letters Patent is:

1. An apparatus for grading peas and the like comprising a substantially circular settling tank having a discharge outlet in its lower portion through which liquid may continuously escape, means for introducing liquid into said tank to maintain a body of liquid therein, at least a portion of said liquid being directed tangentially into said tank to rotate said body of liquid in the manner of a whirlpool, a drum projecting downwardly into the center of said body of liquid to from an annular raceway for the liquid into which the peas may be deposited for separation in accordance with differences in their specific gravities, and means mounting said drum for rotation under the rotative force exerted thereon by said liquid whereby to minimize the formation of eddy currents adjacent the drum surface and thereby increase the rate and effectiveness of separation.

2. An apparatus for grading peas and the like comprising a substantially circular settling tank having a discharge outlet in its lower portion through which liquid may continuously escape, means for introducing liquid into said tank to maintain a body of liquid therein, at least a portion of said liquid being directed tangentially into said tank to rotate said body of liquid in the manner of a whirlpool, a rotatable drum projecting downwardly into the center of said body of liquid to form an annular raceway for the liquid into which the peas may be deposited for separation in accordance with differences in their specific gravities, and means associated with said drum for causing it to rotate at substantially the same speed as the liquid whereby to minimize the formation of eddy currents adjacent the drum surface and thereby increase the rate and effectiveness of separation.

3. An apparatus for grading peas and the like comprising a substantially circular settling tank having a discharge outlet in its lower portion through which liquid may continuously escape, means for introducing liquid into said tank to maintain a body of liquid therein, at least a portion of said liquid being directed tangentially into said tank to rotate said body of liquid in the manner of a whirlpool, a drum projecting downwardly into the center of said body of liquid to form an annular raceway for the liquid into which the peas may be deposited for separation in accordance with differences in their specific gravities, and means mounting said drum for rotation, said drum being provided with projections on its surface whereby it is caused to be driven by and in substantial synchronism with the liquid, thereby minimizing the formation of eddy currents and increasing the rate and effectiveness of separation.

4. An apparatus for grading peas and the like comprising a substantially circular settling tank having a discharge outlet in its lower portion through which liquid may continuously escape, means for introducing liquid into said tank to maintain a body of liquid therein, at least a portion of said liquid being directed tangentially into said tank to rotate said body of liquid in the manner of a whirlpool, a drum in the central portion of said tank and extending from adjacent the bottom of said tank to above the liquid level in said tank to form an annular raceway for the liquid into which the peas may be deposited for separation in accordance with differences in their specific gravities and means mounting said drum for rotation by the liquid, said drum being provided with a series of circumferentially spaced fins extending longitudinally of the axis of said drum whereby said drum is caused to be driven by the liquid in substantial synchronism therewith to thereby minimize the formation of eddy currents and increase the rate and effectiveness of said separation.

5. An apparatus for the separation by flotation of tender peas from hard peas, comprising in combination a settling tank for receiving a depth of liquid therein, an overflow outlet at the upper portion of said tank from which liquid may overflow and carry peas which float, a discharge outlet at the lower portion of the tank for peas which sink, means for introducing liquid tangentially into said tank to cause the liquid in said tank to whirl in a spirally and upwardly flowing current and discharge at said overflow, a rotatable drum projecting downwardly into the liquid in said tank to provide an annular raceway for the whirling liquid into which the peas to be separated may be deposited, said drum being arranged for rotation in said liquid in the direction of flow of the whirling current to minimize the formation of eddy currents in said liquid adjacent the drum surface whereby retardation of the movement of peas in said raceway is minimized and the capacity of the liquid for and effectiveness of said separation is maintained substantially uniform across the width of said annular raceway.

CHARLES E. KERR.